(No Model.)
W. F. COCHRANE.
Mechanical Movement.
No. 234,906. Patented Nov. 30, 1880.
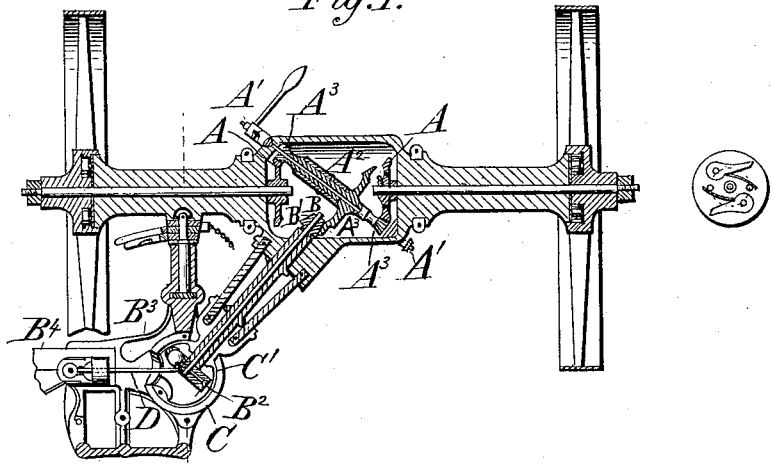
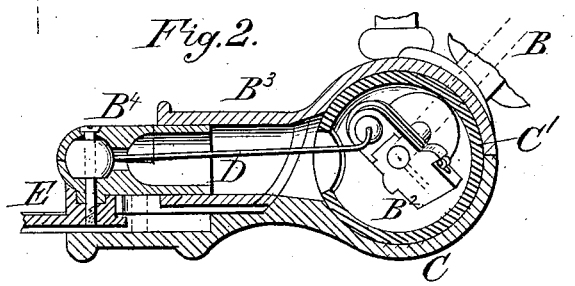
Attest:
F. H. Schott
C. M. Connell
Inventor:
William F. Cochrane
Per Jas. M. Blanchard
Attorney.

UNITED STATES PATENT OFFICE.

WILLIAM F. COCHRANE, OF HARPER'S FERRY, WEST VIRGINIA.

MECHANICAL MOVEMENT.

SPECIFICATION forming part of Letters Patent No. 234,906, dated November 30, 1880.

Application filed May 7, 1880. (No model.)

*To all whom it may concern:*

Be it known that I, WILLIAM F. COCHRANE, a citizen of the United States, residing at Harper's Ferry, in the county of Jefferson and State of West Virginia, have discovered a new and useful Mechanical Movement; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to a newly-discovered mechanical movement for changing a rotary into a reciprocating movement; and the objects of my discovery are, first, to provide for converting the rotative movement of a shaft driven by any prime mover into a reciprocating movement, for the purpose of giving such movement to the cutter-bars of harvesting and mowing machines, to saws for sawing lumber and wood, or to any device where such reciprocating movement is desirable; and, second, to provide a spherical joint, through one portion of the wall of which a rotating shaft passes, and in which said rotative movement is changed to a reciprocating one, and is, through another portion of said wall, communicated to a cutter-bar, saw, or other device, when said bar or saw is at a right or any other desired angle to the crank within said joint. I attain these objects by the mechanism illustrated in the accompanying drawings, in which—

Figure 1 is a sectional elevation, showing my newly-discovered method of converting a rotative movement into a reciprocating one, and providing a spherical joint, and for passing the moving parts through the walls of the sphere as they appear when applied to a mowing or harvesting machine; and Fig. 2 is an enlarged sectional view of the spherical joint and of the sliding guide to which the cutter-bar, saw, or other reciprocating device is attached, the pitman and crank, and also the shaft, in dotted lines, which imparts to said crank its rotative movement.

In providing devices for carrying out my discovery I place upon the shaft or shafts of any prime mover, or upon shafts driven by any such mover, one or more beveled wheels, A, which may be either plain or smooth upon their contact-surfaces or supplied with cogs in the usual manner.

The drawing Fig. 1 shows two driving-shafts and driving-gear wheels; but it is apparent that when the work to be done is not too heavy one of such wheels may be dispensed with and the desired result accomplished with one.

For the purpose of forming a receptacle for the gear wheel or wheels placed upon the driving-shaft, as well as those which are driven by them, there is provided a sleeve or case, which surrounds such shaft, and in which there is formed a chamber of sufficient size to contain said wheels. Running diagonally through the chamber there is a shaft, A', upon which there is placed a sleeve, A², upon one end of which there is a beveled wheel, A³, and upon its opposite end a clutch, by means of which the driving mechanism and that to be driven may be thrown into and out of gear.

To or near the outer ends of shaft A' beveled pinions A³, either smooth-faced or cogged, are attached, which mesh or come in contact with the wheel or wheels A, by which they are driven. The angular position of the shaft A' with reference to the driving-shaft is important, as it affords a convenient method for applying the angular shaft B, through or by which motion is imparted to the interior of a spherical joint, soon to be described. It may, however, have its angularity changed to any desired extent by changing the bevels formed upon the different gear-wheels of the driving mechanism.

Upon the upper or inner end of shaft B there is placed a beveled pinion, B', which, owing to its relation to wheel A³, imparts a rotary movement to shaft B, which passes through a tube or suitable supporting-frame to and into a spherical joint, it carrying upon its lower end a crank, B². The shaft B and also the tube in which it is placed pass through the walls of the two portions of a spherical joint, by which the cutter-bar, saw, or other reciprocating device is connected to the driving mechanism, the walls of the joint being cut away at the point where they enter to permit such passage.

The spherical joint already referred to consists of two hollow spheres, one within the other, they being designated by the letters C C'. The outer one of these spheres has upon a portion of its outer surface sockets or other suitable devices for allowing it to be attached to the frame which supports the shaft B. The interior of this sphere is turned or otherwise rendered smooth upon its surface. Upon another portion of its exterior surface there is formed a projection, $B^3$, which receives a sliding guide, $B^4$. Within the sphere C there is placed another one, lettered C', the former being made to part at its center to enable it to receive the latter, the outer surface of which forms a bearing upon the interior surface of the outer one, while the cavity in its center is of such dimensions as to permit of there being placed therein a crank, $B^2$, which is firmly secured to the end of shaft B, and to allow of its free rotation therein.

At the proper point the wall of the sphere C' is cut away for the purpose of allowing a pitman or connecting-rod, D, to pass through it and to work therein. This connecting-rod is secured to the crank by means of a sphere formed upon the end thereof, which is connected to said crank, the latter being supplied with the requisite adjustable boxes to receive it. The opposite end of rod D is also provided with a sphere, or with an enlargement constituting portions of a sphere, which works in a suitable recess formed in the sliding guide, to which it imparts a reciprocating movement.

E in Fig. 2 is used to designate a portion of a cutter-bar of a harvesting-machine, or a mowing-machine, or the shank of a saw, or other device to which the reciprocating movement of slide $B^4$ is to be imparted.

The arrangement of the parts composing the spherical joint, the shaft B, the slide $B^4$, and the bar which carries the cutting device is such that the cutter-bar of a harvesting-machine, a saw, or other device may be placed in a horizontal or vertical position, or at any desired angle between the two, and be operated equally well in either of these positions, thus enabling the cutting-edges moved by it to be used for cutting grain, grass, trimming hedges, or for any similar purpose, and also for sawing down trees, sawing lumber, or cutting wood, suitable levers being provided for changing the position of the parts as desired.

Having thus described my discovery, what I claim, and desire to secure by Letters Patent, is—

1. The combination, in mechanism for converting a rotary into a reciprocating movement, of a driving-shaft, an intermediate angularly-arranged shaft, and proper wheels for driving the same, with a shaft carrying upon one of its ends a wheel for imparting motion thereto, and upon its opposite end a crank for converting the rotative movement of said shaft into a reciprocating movement, said crank being arranged within a spherical joint, substantially as set forth.

2. A spherical joint for permitting the change of angle of a cutter-bar, a saw, or other reciprocating device, as required, through the walls of which a rotating shaft passes, and within which such rotative movement is converted into a reciprocating one by means of a crank or other suitable device, and through the walls of which said movement is communicated to the device to be moved, substantially as described.

3. The combination, in a device for producing a mechanical movement, of a driving-shaft having upon it wheels for imparting movement to the mechanism, an angular shaft deriving its movements from the wheels on the driving-shaft, and another shaft the outer end of which enters a hollow spherical joint, a crank for converting the rotative movement of the driving-shaft into a reciprocating one, a connecting-rod, and a sliding guide, with a cutter-bar, saw, or other device to be moved, all substantially as described, and for the purpose set forth.

In testimony whereof I affix my signature in presence of two witnesses.

WM. F. COCHRANE.

Witnesses:
C. M. CONNELL,
CHAS. H. ISHAM.